May 20, 1924.   W. F. SCHNEIDER   1,495,113

CULTIVATOR FENDER

Filed Oct. 26, 1922

Inventor:
William F. Schneider.
By Milo B. Stevens & Co.
Attorneys.

Patented May 20, 1924.

1,495,113

UNITED STATES PATENT OFFICE.

WILLIAM F. SCHNEIDER, OF GRANT PARK, ILLINOIS.

CULTIVATOR FENDER.

Application filed October 26, 1922. Serial No. 597,001.

*To all whom it may concern:*

Be it known that I, WILLIAM F. SCHNEIDER, a citizen of the United States, residing at Grant Park, in the county of Kankakee and State of Illinois, have invented new and useful Improvements in Cultivator Fenders, of which the following is a specification.

This invention relates to fenders which are used in connection with cultivators for the purpose of preventing the plants from being covered by the dirt thrown up by the shovels of the implement, and it is the object of the invention to provide a fender of novel and improved design which effectually prevents any dirt from being thrown on the plants, thereby affording complete protection to the same.

In order that the invention may be better understood, reference is had to the accompanying drawing wherein—

Figure 1:
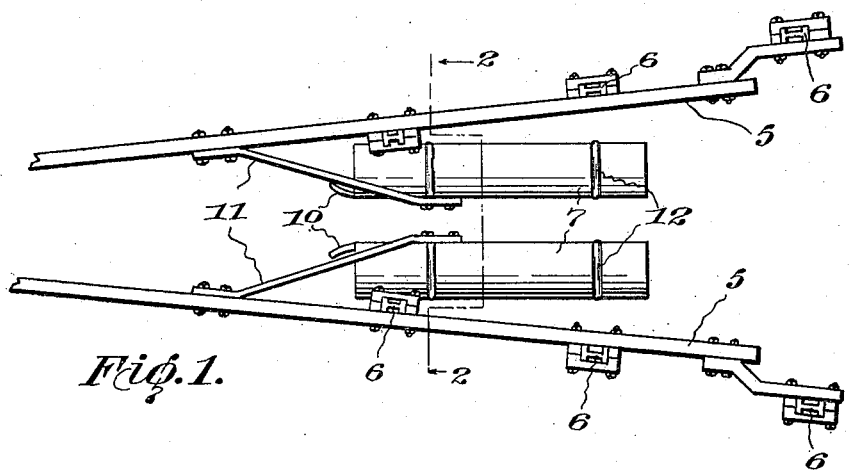
Figure 1 is a plan view showing the application of the invention.
Figure 2:
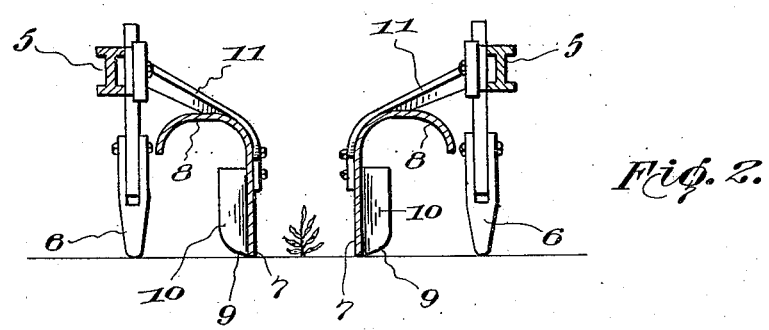
Fig. 2 is a cross-section on the line 2—2 of Fig. 1.
Figure 3:
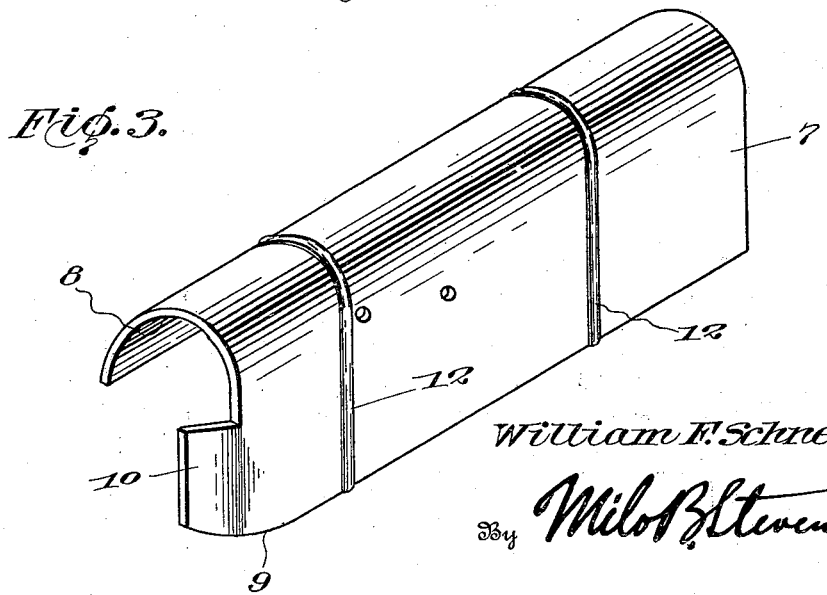
Fig. 3 is a perspective view of the fender unit.

The invention is shown applied to a single row cultivator, but it will be understood that it can also be applied to other types of cultivators. So much only of the cultivator has been shown as will suffice to make clear the connection of the invention therewith. The reference numeral 5 denotes the two gangs of the implement, the same being spaced so that the shovels 6 may run along opposite sides of the plant rows.

The fender consists of an elongated sheet metal plate 7 having at the top a lateral and downward curve forming an arch 8 which describes, at the least, a semicircle. The forward edge of the plate 7, at the bottom thereof, is rounded off as shown at 9, so that it may more readily pass over obstructions as it travels over the ground similar to a runner. The forward end of the plate 7 also has a lateral bend forming a wing 10, the same projecting from the same side of the plate as the arch 8.

Each gang 5 is provided with one of the hereinbefore described fender units, the same being secured to the unit by a bracket 11 in such a position that it extends lengthwise of the cultivator between the plants and the shovels 6. In order to stiffen the plate 7, the same has corrugations 12 running in a vertical direction.

When the implement is in operation, the dirt thrown up by the shovels 6 cannot reach the plants to cover the same. It will be noted that the arch 8 is located on the same side of the plate 7 as the implement shovels 6, and hence the dirt thrown up by the latter cannot go over the top of the plate to the plants, but in going beneath the arch the dirt is deflected laterally and downwardly back to the shovel side of the plate. The front wing 10 catches the dirt which is thrown forwardly, and deflects the same away from the plants in the same direction the dirt is deflected by the arch 8. The fender is not extended back as far as the rearmost shovels because the spacing of these shovels is such that the dirt thrown up thereby is not thrown far enough to reach the plants.

I claim:

A cultivator fender comprising a blank of sheet metal formed with an arched upper portion and a vertical plane side portion which serves as one leg of the arch, there being provided at the anterior end of the plane side portion an angularly disposed wing which is disposed under and in advance of the arched portion, the said wing having a convexly curved lower edge which merges with the lower edge of the plane side portion at a tangent to the curvature of the lower edge of the wing and spaced, parallel corrugations formed in the sheet of metal and disposed transversely of the plane side portion and extending over the upper arched portion.

In testimony whereof I affix my signature.

WILLIAM F. SCHNEIDER.